April 21, 1953      J. F. NELSON      2,636,026
POLYMERIZATION OF OLEFINS IN ANNULAR REACTOR
Filed June 1, 1951
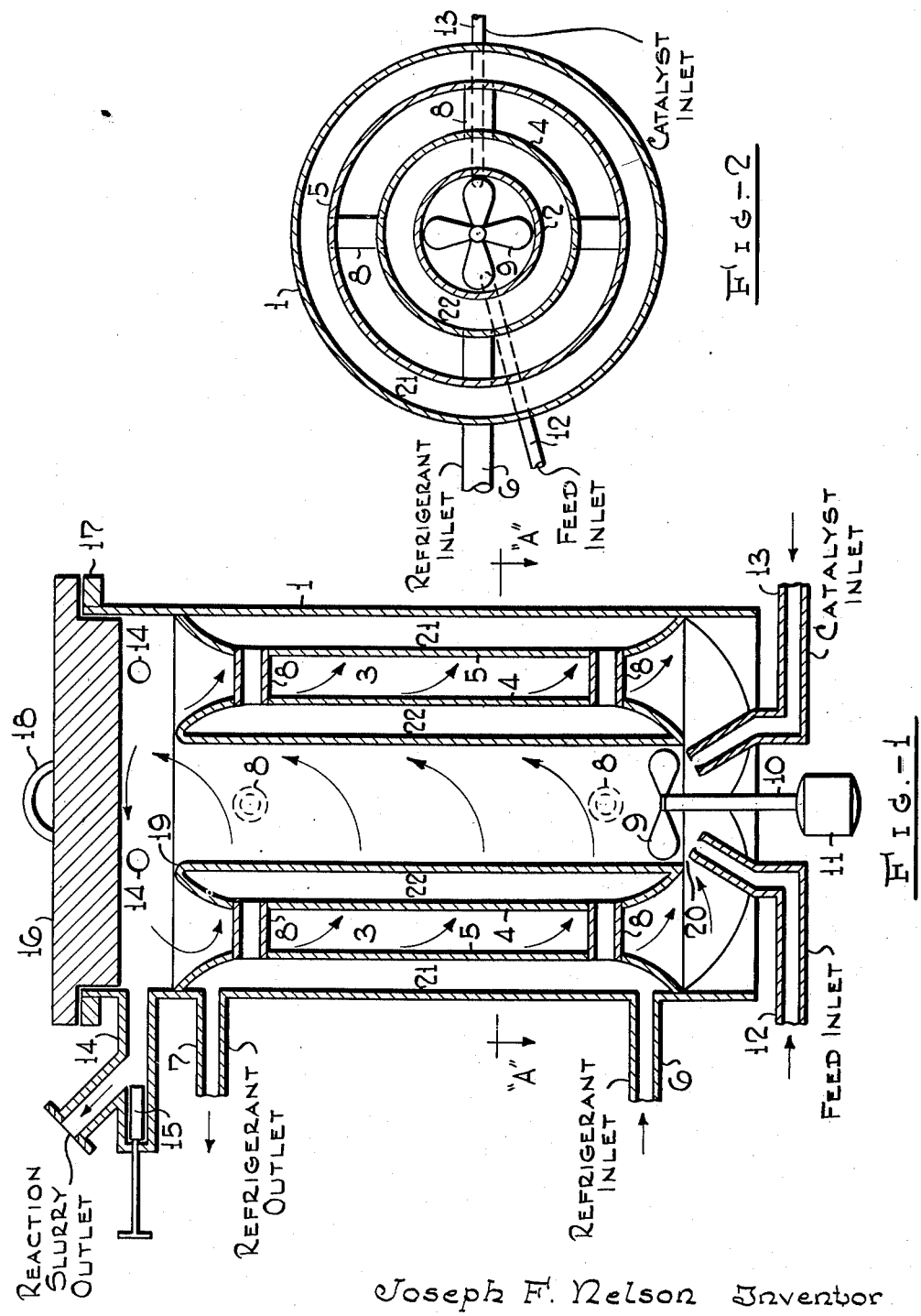
Joseph F. Nelson Inventor
By W. H. Smyers Attorney

UNITED STATES PATENT OFFICE 2,636,026

POLYMERIZATION OF OLEFINS IN ANNULAR REACTOR

Joseph F. Nelson, Clark Township, Union County, N. J., assignor to Standard Oil Development Company, a corporation of Delaware Application June 1, 1951, Serial No. 229,301

8 Claims. (Cl. 260—85.3)

The present invention pertains to the preparation of polymers from isomonoolefins or mixtures of isomonoolefins and diolefins or monoolefins by the treatment thereof with dissolved Friedel-Crafts type catalysts at low temperatures and in particular, to a novel process which may be utilized for continuous operation of the foregoing polymerization reaction.

High molecular weight polymers such as polyisobutylene of 15,000–25,000 up to about 300,000 molecular weight (as determined by the Staudinger method) have been prepared by polymerizing isomonoolefins such as isobutylene in contact with a dissolved Friedel-Crafts type catalyst at temperatures below $-10°$ C. and preferably below $-40°$ C. Products which are vulcanizable or curable with sulfur are obtained if a minor proportion of a diolefin is added to a major proportion of an isomonoolefin and the resultant mixture is polymerized at temperatures below $-10°$ C. and preferably at or about $-100°$ C. by the application thereto of a solution of a Friedel-Crafts type catalyst in a low-freezing, non-complex forming solvent such as a lower alkyl halide, carbon disulfide or the like. If a monoolefin such as styrene is employed with the isobutylene, useful resin type products are obtained.

This application is a continuation-in-part of application Serial No. 545,099, filed July 15, 1944, which issued December 11, 1951, as U. S. Patent 2,577,856.

These polymerizations have been carried out batchwise and continuously and with liquefied ethylene added to the reaction mixture as a diluent-refrigerant or in the presence of substantial amounts of alkyl halides and the like as diluents in the apparatus provided with means for absorbing the exothermic heat of reaction. By and large the latter has been found to be the preferred method of conducting the polymerization since it not only lends itself well to continuous operation but is capable of better control with the formation of polymers of improved physical characteristics in greater yields. One reactor of this type is disclosed and claimed in application Serial No. 448,575, filed June 26, 1942, now abandoned, by John H. Bannon. In this reactor a draft tube provided with an agitator is arranged centrally of the reactor and a plurality of return tubes are arranged between headers arranged around the central draft tube with means for circulating a suitable refrigerant, desirably ethylene through the space between the headers and around the central draft tube as well as the return tubes. This type of reactor has been used extensively for this type of reaction since a maximum amount of heat transfer surface can be obtained in this way in a reactor of a given height and volume. However, a serious problem encountered with this reactor is that of accumulation of polymer on the upper entrance tube sheet and plugging of the return tubes, especially at their entrance ends. The exact cause of this trouble has never been determined, but it has been general and persistent under widely varying conditions of operation.

It is an object of this invention to provide the art with a continuous polymerization process using a reactor of the indirect heat exchange type which is relatively free of tendencies to plug.

It is also the object of this invention to provide the art with a continuous process in which the reaction mixture is recirculated in highly agitated and turbulent flow.

It is a further object of this invention to provide the art with a polymerization process using reactors having an improved heat transfer coefficient.

These and other objects will appear more clearly from the detailed description and claims which follow.

It has now been found that a polymerization reactor which is practically free from tendencies to plug and which possesses a high heat transfer coefficient is obtained if the reactor is constructed with a central draft tube provided with an impeller and a return tube made in the form of an annular passageway completely surrounding the draft tube and provision is made for maintaining a refrigerant in contact with each of the wall surfaces with which the reaction mixture comes into contact. Under the impetus of the impeller or agitator the reaction mixture moves upwardly through the central draft tube as a swirling, turbulent stream and since there are no obstructions in the return passageway other than a few crossover members for supplying refrigerant to the space between the central draft tube and the inner wall of the annular return passageway the return flow through the annular passageway is substantially as swirling and turbulent as that in the central draft tube. The reaction mixture follows a generally helical course upwardly in the central draft tube and also downwardly in the return annular channel, thereby substantially increasing the amount of contact of the reaction mixture with the cooling surfaces, this flow contributing to the high heat transfer coefficient of the reactor in accordance with the present invention. While the flow is indicated as being upwardly in the central draft tube and downwardly in the return annulus, it will be understood that the direction of flow could just as well be downwardly in the central draft tube and upwardly in the return annulus.

To describe one preferred modification of the apparatus reference is made to the accompanying drawing. This drawing illustrates one type of reactor preferred for use in the process of the present invention.

Figure 1 is a vertical cross-section of the polymerization reactor, and

Figure 2 is a horizontal cross-section of the reactor along the line A—A of Figure 1.

Referring to the drawings, the reactor comprises an outer shell member 1 within which are arranged a central draft tube 2 and an annular return passageway 3 formed by inner cylindrical wall 4 and an outer cylindrical wall 5. In order to remove the exothermic heat of reaction a refrigerant is supplied to an outer cooling jacket 21 comprising the space between the outer shell member 1 and the cylindrical wall 5 and also to an inner cooling jacket 22 comprising the space between the inner wall member 4 and the central draft tube 2. The refrigerant is supplied to the reactor through inlet 6 and is withdrawn, generally in vaporized form, through the outlet 7. A plurality of crossovers 8 are arranged across the annular passageway into the inner cooling jacket 22. Generally, the lower crossovers carry the liquid refrigerant while the upper ones carry vaporized refrigerant, or they may carry both liquid and vapor. In order to reduce the number of obstructions in the circulating reaction mixture stream, the crossover members 8 are preferably made of sufficient size and strength and are attached to wall members 4 and 5 sufficiently securely as by welding to support the entire wall 4 and central draft tube 2 assembly.

A propeller-agitator 9 of any desired type is arranged at the bottom of the central draft tube 2 and is attached to drive shaft 10 connected to a suitable source of power such as a motor 11.

A feed inlet 12 for the supply of isoolefin or isoolefin-diolefin mixtures and diluent is arranged at the bottom of the reactor with the discharge end of the inlet member in fairly close proximity to the agitator 9 in order to obtain prompt and uniform distribution of the fresh feed into the contents of the reactor. A similar inlet 13 is also provided for the supply of catalyst solution to a zone of relatively high turbulence in the reactor. At least one and, if desired, several outlet ports 14 are arranged at the upper portion or top of the reactor to permit withdrawal of reaction slurry from the reactor. Valves 15, although not necessary, can be used and preferably are of the plunger or piston type, and can be arranged in the outlet ports in order to close off the outlet when desired or to clean the ports 14. In general, only one such port 14 is actually used in practice, however, there are several openings 14 in the reactor. For instance, catalyst and feed tubes may be located at the top although they are preferred at the bottom for maximum dispersion. Piston type valves are preferred since they are self-cleaning and lie flush with the inside wall of the reactor when closed.

The top of the reactor is closed by means of a head 16 which rests upon lugs 17 on the reactor shell and is secured in place during operation by bolts or any suitable clamping arrangement which permits ready removal of the head for inspection or cleaning of the reactor. Lifting lugs 18 are provided on the head 16 for convenience in removing the head.

In one embodiment, the head is concave on the inner surface, the curving surface extending between circumference of head and a point in the head which is located by the central axis of the draft tube parallel to the walls. For instance, this is shown in Figure 1 for bottom of reactor. This arrangement provides for more efficient flow for avoiding dead spaces where polymer fouling may occur.

The method of operation of the reactor in accordance with the present invention is substantially as follows: The reactor which may be cooled or partially cooled, is filled with reaction mixture, preferably precooled, comprising a diluent such as carbon disulfide, ethyl or methyl chloride, or a hydrocarbon such as butane and an isoolefin such as isobutylene or mixtures of isobutylene and a diolefin such as isoprene, butadiene, piperylene, or dimethyl butadiene, or a monoolefin such as styrene. A refrigerant, preferably liquid ethylene, is introduced into the outer cooling jacket 21 and through crossovers 8 into the inner cooling jacket 22. Other refrigerants which can be used include methyl fluoride, B. P. $-78.6°$ C., and ethane, B. P. about $-89°$ C. The pressure, for instance, on the ethylene is about atmospheric, at which pressure the boiling point of ethylene is about $-95.5°$ C. to $-101°$ C. The agitator 9 is placed in operation causing the reaction mixture to rise in the central draft tube and return through the annular passageway. Assuming counterclockwise rotation of the agitator the reaction stream rising in the central draft tube is given a rapid counterclockwise rotary or swirling movement which continues not only in the space at the top of the draft tube but in the return passageway 3 causing the reaction liquid to circle the inner jacket in passing from the central draft tube overflow 19 to the draft tube inlet zone 20.

When the reaction mixture has been cooled to the desired reaction temperature, a dilute solution of a Friedel-Crafts type catalyst in a low freezing non-complex forming solvent such as methyl or ethyl chloride, carbon disulfide, or a hydrocarbon such as butane, precooled to about reaction temperature is introduced into the reaction mixture through catalyst inlet 13. The rates of the feed of fresh reaction mixture, desirably precooled to about reaction temperature, and catalyst solution, are adjusted in such a way as to give the desired degree of conversion in the reactor. Reaction mixture comprising a solution or a slurry of solid polymer particles in a mixture of unreacted olefinic materials and diluent continuously overflows the reactor through outlet port 14 and is passed either to suitable flashing equipment wherein the low boiling materials are vaporized, as by dropping the slurry into a heated flashing liquid, such as water, or to a filtering or screening device which will separate the polymer particles from the cold reaction liquid. After separation, the cold reaction liquid is then suitable for immediate recycling to the reactor.

The present invention is applicable to the preparation of any solid, high molecular weight, low temperature polymerizates from isoolefinic hydrocarbons or from mixtures of isoolefinic hydrocarbons with a diolefinic compound or a monoolefinic compound capable of copolymerizing with isoolefinic materials at low temperatures in the range of —40° C. to —164° C., in the presence of dissolved Friedel-Crafts type catalysts. The preferred isoolefin is isobutylene but other isoolefins containing up to about 8 carbon atoms per molecule may be used. The copolymerizable diolefinic materials include butadienes and substituted butadienes, especially isoprene, piperylene and dimethyl butadiene. Other polyolefinic materials containing up to 12 or 14 carbon atoms per molecule such as myrcene and certain non-conjugated diolefins, such as dimethallyl and divinyl benzene and the like, are also useful for polymerization with isobutylene. The ratio of isoolefin to diolefin in the liquid reaction mixture is from about 50 to 99 weight per cent of isoolefin to about 50 to 1 weight per cent of diolefin when the latter is a $C_4$ diolefin, although a ratio of 2 parts of butadiene to 1 part of isobutylene can be used to get very highly unsaturated polymers. With $C_5$ and higher diolefins, the amount of diolefin is less than 25 weight per cent and preferably less than 6 weight per cent. A third component such as dimethallyl or divinyl benzene can also be employed to modify the characteristics of the polymer. Monoolefins, especially styrene and the methylated styrenes can also be copolymerized with isobutylene. Amounts of from 5 to 75 per cent by weight of styrene can be employed with from 95 to 25 per cent by weight of isobutylene.

The catalyst used may be boron fluoride in solution, or it may be a solution of a conventional Friedel-Crafts type catalyst such as aluminum chloride, aluminum bromide, titanium tetrachloride, zirconium tetrachloride, uranium chlorides, etc. For catalyst solvent, there can be used a mono- or polyhalogenated alkyl solvent containing less than 5 carbon atoms per molecule, carbon disulfide or the like. Butane or other low molecular weight hydrocarbons may be used when aluminum bromide is the catalyst employed. Diluents that may be used in the process include the alkyl halides containing less than 5 carbon atoms, preferably methyl chloride as well as hydrocarbons containing less than about 5 carbon atoms such as methane, ethane, ethylene, butane, pentanes or hexanes.

There are certain conditions under which the polymer slurries are unstable and such conditions should be avoided in order to achieve the best results. Agglomeration of the polymer in the polymer slurry is favored by higher temperatures, lower molecular weight of the polymer, and the use of diluents which tend to moderately solvate the polymer under the operating conditions.

Stable slurries of polybutenes can be produced at —90° C. with methyl chloride-isobutylene feeds by maintaining a volume ratio of methyl chloride to isobutylene over about 0.7:1 in the reaction mixture, with good agitation throughout the slurry (Reynolds numbers over about 5,000–6,000 and preferably over 10,000). At higher temperatures, higher diluent ratios are required up to temperatures of about —50° C. which is the approximate limit for high molecular weight polymer slurry. This temperature effect on molecular weight has been described by Thomas, Sparks, Frolich, Otto, and Mueller-Cunradi in the Journal of the American Chemical Society, vol. 62, page 276 (1940). As is also indicated in that article, impurities in the reaction mixture tend to lower the molecular weight and the lower the molecular weight of the polymer, the higher the diluent ratio required to form a satisfactory slurry.

The same general principles apply to the production of low temperature isoolefin-diolefin and isoolefin-monoolefin copolymerizate slurries. The molecular weight of these polymers, as determined by the Staudinger method, are considerably lower than those of polybutenes prepared under otherwise similar conditions. This effect is attributable to the presence of diolefin in the reaction mixture. At —90° C., diluent ratios above 1:1 and preferably over 2:1 should obtain in the reaction zone. In the case of a hydrocarbon diluent, the ratio may be lower, i. e., 1 part of diluent to 4 parts of reactant. In the manufacture of these copolymers the reaction temperature should not exceed about —60° C. When using aluminum chloride-methyl chloride catalyst solutions, the concentration of aluminum chloride may be up to about 1 gram per 100 cc.

Low temperature isoolefin-diolefin copolymers of normal molecular weight for use as rubber substitutes, i. e., having a Staudinger molecular weight of about 25,000 and above can be maintained as a slurry provided that the percent reactants is not too high when the diluent is a non solvent for the polymer. Thus, when the reaction liquid contains 60–90 weight per cent of methyl chloride, the slurries containing polymer averaging over roughly 25,000 molecular weight are quite stable, but if the percentage of methyl chloride is reduced to about 30% the slurry becomes unstable and the polymer particles tend to agglomerate. With increasing diolefin content of the isoolefin-diolefin feed, the molecular weight of the resultant copolymer is lowered and the temperature necessary for the maintenance of a stable slurry is lowered. Increasing diluent ratio will also compensate, to a limited extent, for lower molecular weight of polymer, thereby permitting slurry formation.

The following examples are typical illustrations to describe the operation of the process of this invention:

*Example 1*

A battery of 7 annular reactors designed in accordance with Figure 1, having a capacity of about 1500 gallons was operated continuously for one month. Boiling ethylene at essentially atmospheric pressure was used as the refrigerant. The feed to the reactor consisted of 78.1 parts of methyl chloride and 21.9 parts of hydrocarbon of which 20.6 parts were isobutylene, 0.47 part was isoprene, and the remainder normal butenes. This amount of isoprene corresponds to 2.33% based on the isobutylene. The average feed rate to the reactors on stream was 11,868 pounds per hour per reactor. A catalyst consisting of 0.096 weight per cent $AlCl_3$ in methyl chloride was simultaneously fed to the reactor at a rate to give 77% conversion of the reactants at a catalyst efficiency of 2150 pounds of polymer produced per pound of $AlCl_3$ fed. The concentration of rubber in the reactor was 14.9%. It was in the form of a slurry and left the reactor through outlet 14 shown in Figure 1. 94.75% of the rubber produced was in the range of 40 to 50 Mooney viscosity. One-third of the product was fast-curing rubber, and two-thirds was of a slower but normal cure rate useful for many purposes. The run length per reactor ranged from 48 to 77 hours before cleaning became necessary. This run length is to be compared with runs of much lesser length in other reactors of less suitable design.

Example 2

A run similar to that described in Example 1 was made except that polymer of higher molecular weight and faster cure rate was prepared. The following describes this run made in the same equipment as in Example 1.

Feed:

| | |
|---|---|
| Methyl chloride _____parts__ | 74.2 |
| Hydrocarbon: | |
|    Isobutylene _____ | 24.3 |
|    Isoprene _____ | .56 |
|    n-Butenes _____ Remainder | |
|    Total _____ | 25.8 |
| Per cent isoprene on isobutylene___ | 2.52 |
| Feed rate, lbs./hr./reactor_____ | 11,200 |
| Catalyst concen. wt. per cent AlCl$_3$___ | 0.08 |
| Per cent conversion_____ | 78.1 |
| Catalyst efficiency _____ | 2,130 |
| Slurry concen. wt. per cent_____ | 17.3 |
| Run lengths, hrs_____ | 30 to 80 |
| Per cent of product rubber above 80 Mooney _____ | 65.5 |
| Per cent of product rubber of 70–79 Mooney _____ | 15.7 |

Of the product produced 81.3% was of fast cure rate and 18.7% was of extra fast cure rate.

Example 3

In another run very similar to that described in Example 2, except that the operation was very smooth, the following results were obtained:

| | |
|---|---|
| Weight per cent of product rubber in 80–89 Mooney range _____ | 65.47 |
| Weight per cent of product rubber in 70–79 Mooney range _____ | 34.47 |

All of the product on curing was classified as possessing a uniform fast cure rate.

Example 4

A run similar to that described in Example 1 was made except that a battery of three reactors was used and the run period was for one week. The intention was to produce rubber in the range of 40 to 50 Mooney viscosity. The following data describe this run:

Feed:

| | |
|---|---|
| Methyl chloride _____parts__ | 72.5 |
| Hydrocarbon: | |
|    Isobutylene and isoprene and n-butenes _____ | 27.5 |
|    Per cent isoprene on isobutylene_____ | 2.8 |
| Feed rate: lbs./hr./reactor_____ | 9770 |
| Catalyst rate: lbs./hr./reactor_____ | 880 |
| Catalyst concentration, wt. per cent AlCl$_3$__ | 0.19 |
| Per cent conversion_____ | 54.2 |
| Catalyst efficiency _____ | 900 |
| Slurry concentration, wt. per cent_____ | 13.5 |
| Per cent purge [1] of C$_4$ (per cent of fresh C$_4$ feed) _____ | 14.7 |
| Per cent n-butenes in purge_____ | 5.3 |
| Average run length/reactor_____hours__ | 39.8 |
| Average Mooney viscosity of product_____ | 47 |

[1] This purge was made to maintain the n-butene level at the figure required to give the desired Mooney.

Example 5

A run similar to Example 4 was made, except that in addition to the isobutylene and isoprene in the feed 0.4% of divinylbenzene based on the isobutylene was included in the feed. The polymerization proceeded in the normal manner. The rubber produced was of improved quality for some purposes, since it had less cold flow than a similar polymer made in the absence of divinylbenzene.

Example 6

Another run was made similar to Example 4 except that no isoprene was included in the feed and the amount of isobutylene was reduced to 20 parts in 80 parts of methyl chloride. The polyisobutylene made possessed a molecular weight of 100,000 to 200,000 by the Staudinger method depending on the extent of the conversion of the isobutylene.

The foregoing description contains a limited number of embodiments of the present invention, but it will be understood that numerous variations are possible without departing from the purview of this invention as defined in the following claims.

What is claimed is:

1. A process for carrying out polymerization reactions below −10° C., which comprises continuously circulating liquid olefinic hydrocarbon reactants in a continuous, closed path consecutively through a centrally-positioned tubular zone, and then through an annularly-positioned tubular return zone, as a swirling, turbulent stream, continuously withdrawing heat from the walls of the tubular reaction zones, introducing a dissolved Friedel-Crafts catalyst and fresh olefinic feed directly into the path of circulation and continuously withdrawing a slurry of polymer from another point in the path.

2. A process for carrying out polymerization reactions below −10° C., which comprises continuously circulating at least one liquid olefinic hydrocarbon reactant in a continuous closed path through a centrally-located tubular zone, and then through an annular, concentric tubular zone, as a swirling, turbulent stream, continuously withdrawing heat by indirect heat exchange, from the walls of the tubular reaction zones, introducing a dissolved Friedel-Crafts polymerization catalyst and fresh olefinic feed directly by separate streams into the path of circulation and continuously withdrawing a slurry of polymer from another remote point in the circulation path.

3. A process for carrying out polymerization reactions below −10° C. which comprises continuously circulating liquid olefinic hydrocarbon reactants selected from the group consisting of isomonoolefins, mixtures of isomonoolefins and diolefins, and mixtures of isomonoolefins with aromatic hydrocarbons containing one polymerizable olefinic double bond, in a continuous, closed path consecutively through a centrally-positioned tubular zone, and then through an annularly-positioned tubular return zone, as a swirling, turbulent stream, continuously withdrawing heat from the walls of the tubular reaction zones, introducing a dissolved Friedel-Crafts catalyst and fresh olefinic feed directly into the path of circulation and continuously withdrawing a slurry of polymer from another point in the path.

4. A continuous process for carrying out polymerization reactions below −10° C., which comprises continuously circulating liquid olefinic hydrocarbon reactants selected from the group consisting of isomonoolefins, mixtures of isomonoolefins and diolefins, and mixtures of isomonoolefins with aromatic hydrocarbons containing one polymerizable olefinic double bond, in a continuous, closed path through a centrally-located tubular reaction zone, and then through an annularly-positioned tubular return zone, as a swirling, turbulent stream, continually withdrawing heat from the walls of the tubular reaction zones by indirect heat transfer with a continuously circulating coolant, introducing a Friedel-Crafts polymerization catalyst solution and fresh olefinic reactant feed by separate streams into the path of circulation at the point of maximum turbulence, and continuously withdrawing a slurry of polymer product from another, remote point in the circulation path.

5. A polymerization process which comprises circulating a liquid mixture of isobutylene and a minor proportion of a conjugated diolefin rapidly in a continuous, closed path, through a tubular reaction zone, and then through an annular, concentrically positioned tubular return zone, as a swirling, turbulent stream, continuously withdrawing heat from the walls of the reaction zones to maintain the temperature at all times below $-10°$ C., introducing dissolved Friedel-Crafts catalyst and liquid feed mixture by separate streams into the path of circulation, and continuously withdrawing a slurry of copolymer from another point in the circulation path.

6. A continuous polymerization process which comprises circulating a liquid reactant mixture consisting of a major proportion of isobutylene and a minor proportion of a conjugated diolefin, rapidly in a continuous closed path consecutively through a tubular reaction zone, and then through an annularly-positioned, tubular return zone, as a swirling, turbulent stream, continuously withdrawing heat by indirect heat exchange from the walls of the reaction zones, to maintain the temperature at all times below $-40°$ C., introducing a Friedel-Crafts polymerization catalyst solution and liquid feed mixture separately into the path of circulation, and continuously withdrawing a slurry of copolymer from another remote point in the circulation path.

7. A process according to claim 6 in which the conjugated diolefin is isoprene.

8. A process according to claim 6 in which the conjugated diolefin is butadiene.

JOSEPH F. NELSON.

References Cited in the file of this patent

UNITED STATES PATENTS

| Number | Name | Date |
|---|---|---|
| 2,443,817 | Draeger | June 22, 1948 |
| 2,444,848 | Purvin | July 6, 1948 |
| 2,507,105 | Howard | May 9, 1950 |
| 2,577,856 | Nelson | Dec. 11, 1951 |